(12) United States Patent
Kim et al.

(10) Patent No.: US 11,232,816 B2
(45) Date of Patent: Jan. 25, 2022

(54) MULTI-WINDOW VIEWING SYSTEM INCLUDING EDITOR FOR REACTION VIDEO AND METHOD FOR PRODUCING REACTION VIDEO BY USING SAME

(71) Applicant: Sukyung Kim, Seoul (KR)

(72) Inventors: Sukyung Kim, Seoul (KR); John Woo Shik Kim, Seoul (KR)

(73) Assignee: Sukyung Kim, Seoul (KR)

( * ) Notice: Subject to any disclaimer, the term of this patent is extended or adjusted under 35 U.S.C. 154(b) by 0 days.

(21) Appl. No.: 17/058,013

(22) PCT Filed: May 27, 2019

(86) PCT No.: PCT/KR2019/006334
§ 371 (c)(1),
(2) Date: Nov. 23, 2020

(87) PCT Pub. No.: WO2019/226031
PCT Pub. Date: Nov. 28, 2019

(65) Prior Publication Data
US 2021/0201954 A1    Jul. 1, 2021

(30) Foreign Application Priority Data
May 25, 2018   (KR) .......................... 10-2018-0059598

(51) Int. Cl.
*G11B 27/036*   (2006.01)
*H04N 9/87*   (2006.01)

(52) U.S. Cl.
CPC ............. *G11B 27/036* (2013.01); *H04N 9/87* (2013.01)

(58) Field of Classification Search
CPC ................................ G11B 27/036; H04N 9/87
See application file for complete search history.

(56) References Cited

U.S. PATENT DOCUMENTS 6,321,024 B1 * 11/2001 Fujita ................... G11B 27/034
                                                    386/281
8,009,962 B1 *  8/2011 Herz .................... G11B 27/105
                                                    386/248

(Continued)

FOREIGN PATENT DOCUMENTS

KR    10-2015-0066203 A    6/2015

OTHER PUBLICATIONS

International Search Report for PCT/KR2019/006334 dated Sep. 25, 2019.

(Continued)

*Primary Examiner* — Thai Q Tran
*Assistant Examiner* — Jose M Mesa
(74) *Attorney, Agent, or Firm* — The PL Law Group, PLLC

(57) ABSTRACT

A multi-window viewing system according to an embodiment includes an editor for a reaction video and a player for reproducing the reaction video generated therefrom, in which the editor including a video image input unit that inputs a first video image for producing a reaction video, a video image information input unit that inputs video image information including an Internet address of a second video image intended to be inserted into the first video image, a setting information generation unit that generates setting information including coordinates of an area in which the second video image is to be inserted and reproduced in the first video image, and information on a reproduction start time and a reproduction end time of the second video image, and a reaction video generation unit that generates a reaction video by combining the first video image, the video image information, and the setting information.

19 Claims, 4 Drawing Sheets

(56) References Cited

U.S. PATENT DOCUMENTS

| | | |
|---|---|---|
| 9,253,551 B1* | 2/2016 | Lewis ................ H04N 21/8545 |
| 2010/0238303 A1 | 9/2010 | Newell |
| 2012/0324491 A1 | 12/2012 | Bathiche et al. |
| 2014/0022329 A1* | 1/2014 | Kim ................ H04N 21/42224 |
| | | 348/14.03 |
| 2014/0096167 A1 | 4/2014 | Lang et al. |
| 2015/0156543 A1 | 6/2015 | Allegretti et al. |
| 2015/0172594 A1* | 6/2015 | Takada ................ H04N 5/775 |
| | | 386/219 |
| 2016/0234551 A1 | 8/2016 | Allegretti et al. |
| 2016/0370975 A1 | 12/2016 | Collins et al. |

OTHER PUBLICATIONS

European Search Report For EP19808165.5 dated Nov. 9, 2021 from European patent office in a counterpart European patent application.

* cited by examiner

MULTI-WINDOW VIEWING SYSTEM INCLUDING EDITOR FOR REACTION VIDEO AND METHOD FOR PRODUCING REACTION VIDEO BY USING SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2019/006334, filed May 27, 2019, which claims priority to the benefit of Korean Patent Application No. 10-2018-0059598 filed in the Korean Intellectual Property Office on May 25, 2018, the entire contents of which are incorporated herein by reference.

TECHNICAL FIELD

The present invention relates to a multi-window viewing system including an editor for a reaction video and a method for producing the reaction video using the same.

BACKGROUND ART

In general, there are various media that can share moving video image content on the Internet, including YOUTUBE, VIMEO, METACAFE, CRACKLE, QUITETUBE2, and SYNCTUBE, and among these moving video image contents, a reaction video accounts for a significant portion and continues to grow.

In the conventional reaction video, a final reaction video is generated in such a way that a first reaction video image is generated by recording a process of a producer's reaction to the content such as a sound source and a music video, and after that, the content such as the sound source and the music video to which the producer has reacted is inserted into the reaction video image described above so that viewers can grasp what content to which the producer has reacted.

Meanwhile, since the reaction video is uploaded to the Internet by inserting the content such as the sound source or the music video to which the producer has reacted without permission, there is a problem in that an intellectual property rights problem such as copyright infringement occurs.

Such copyright infringement has been constantly occurring, starting with Viacom's 1 trillion-won lawsuit against YouTube for 10,000 contents in 2007, and in case of violation of the Digital Millennium Copyright Act (DMCA), the reaction video may be deleted, as well as sanctions may be imposed on user accounts.

In addition, on sharing sites where reaction videos are uploaded, etc., the infringement of intellectual property rights of numerous contents including reaction videos should be monitored for infringement of intellectual property rights from time to time and when disputes related to intellectual property rights occur, they must be mediated or resolved, and thus there is a problem in that considerable cost and manpower are consumed.

SUMMARY

The present invention has been devised in view of the problems described above, and an object thereof is to provide a multi-window viewing system including an editor for a reaction video capable of preventing copyright infringement and a method for producing the reaction video using the same.

The objects of the present invention are not limited to the objects mentioned above, and other objects that are not mentioned will be clearly understood by those skilled in the art from the following description.

In accordance with an embodiment of the present invention, there is provided a multi-window viewing system including an editor for a reaction video and a player for reproducing the reaction video generated from the editor, in which the editor includes a video image input unit that inputs a first video image for producing a reaction video, a video image information input unit that inputs video image information including an Internet address of a second video image intended to be inserted into the first video image with respect to at least one the second video image, a setting information generation unit that generates setting information including coordinates of an area in which the second video image is to be inserted and reproduced at a predetermined position in the first video image and information on a reproduction start time and a reproduction end time of the second video image, and a reaction video generation unit that generates a reaction video by combining the first video image, the video image information, and the setting information.

In a preferred embodiment, the first video image may be a video image in which a reaction video producer who reacts to a specific content is recorded and the second video image may be a video image of the specific content to which the reaction video producer has reacted.

In a preferred embodiment, the setting information generation unit, when generating the setting information, may set an area in which the second video image is to be inserted and reproduced relatively smaller than that of the first video image, but, if a video image size of the first video image is adjusted, generate the setting information so that a size of an area in which the second video image is to be reproduced is also enlarged or reduced in response thereto.

In a preferred embodiment, the setting information generation unit, when generating the setting information, may set information on volume, tone, and brightness of the first video image and the second video image, respectively, and generate the setting information so that each of the set information is individually adjusted through the player.

In a preferred embodiment, the reaction video generation unit, when generating the reaction video, may generate the reaction video in a form of a video image file or data packet.

In a preferred embodiment, the reaction video generation unit, when generating the reaction video, may generate the reaction video in a form of an information storing image including a quick response code (QR code).

In a preferred embodiment, the setting information generation unit, when there are a plurality of second video images intended to be inserted into the first video image, may generate the setting information for each second video image.

In a preferred embodiment, the player may include a reproduction request reception unit that receives a reproduction request for the reaction video, a first video image reproduction unit that reproduces the first video image of the reaction video requested to be reproduced in a first window, and a second video image reproduction unit that imports the second video image by referring to the video image information of the reaction video requested to be reproduced, generates a second window at a predetermined position of the first window by referring to the setting information, and then reproduces the imported second video image in the second window.

In a preferred embodiment, the second video image reproduction unit may start reproducing the second video image according to the reproduction start time of the setting information and end the reproduction of the second video image according to the reproduction end time, thereby making the second window disappear, and stop reproducing the second video image as well when the first video image is stopped.

In a preferred embodiment, the second video image reproduction unit, when the size of the first window in which the first video image is reproduced is adjusted, may enlarge or reduce the size of the second window in which the second video image is reproduced accordingly.

In a preferred embodiment, the first video image reproduction unit, when reproducing the reaction video, may adjust the volume, tone, and brightness of the first video image according to a user input, and the second video image reproduction unit, when reproducing the reaction video, may adjust the volume, tone, and brightness of the second video image according to the user input.

In accordance with another embodiment of the present invention, there is provided a method for producing a reaction video using a multi-window viewing system, including (1) receiving, by the multi-window viewing system, a first video image for producing a reaction video, (2) receiving, by the multi-window viewing system, video image information including an Internet address of a second video image intended to be inserted into the first video image with respect to at least one the second video image, (3) generating, by the multi-window viewing system, setting information including coordinates of an area in which the second video image is to be inserted and reproduced at a predetermined position in the first video image and information on a reproduction start time and a reproduction end time of the second video image, and (4) generating, by the multi-window viewing system, a reaction video by combining the first video image, the video image information, and the setting information.

In a preferred embodiment, the first video image may be a video image in which a reaction video producer who reacts to a specific content is recorded and the second video image may be a video image of the specific content to which the reaction video producer has reacted.

In a preferred embodiment, in the step (4), the multi-window viewing system, when generating the reaction video, may generate the reaction video in a form of a video image file or data packet.

In a preferred embodiment, in the step (4), the multi-window viewing system, when generating the reaction video, may generate the reaction video in a form of an information storing image including a quick response code (QR code).

By the problem solving means described above, the present invention is a multi-window viewing system which includes an editor for a reaction video and a player for reproducing the reaction video generated therefrom, in which the editor including a video image input unit that inputs a first video image for producing a reaction video, a video image information input unit that inputs video image information including an Internet address of a second video image intended to be inserted into the first video image, a setting information generation unit that generates setting information including coordinates of an area in which the second video image is to be inserted and reproduced at a predetermined position in the first video image, and information on a reproduction start time and a reproduction end time of the second video image, and a reaction video generation unit that generates a reaction video by combining the first video image, the video image information, and the setting information, and thus has the effect of preventing the occurrence of copyright infringement and enabling the creation and viewing of reactive videos by allowing that video images which may cause copyright infringement are not actually inserted into the response video but only video image information such as an Internet address for video image reproduction is included.

DETAILED DESCRIPTION

In the following description, specific details of the invention are illustrated to provide a general understanding of the invention, it will be apparent to those of ordinary skill in the art that the present invention can be easily practiced without these specific details and also by their modifications.

Figure 1:
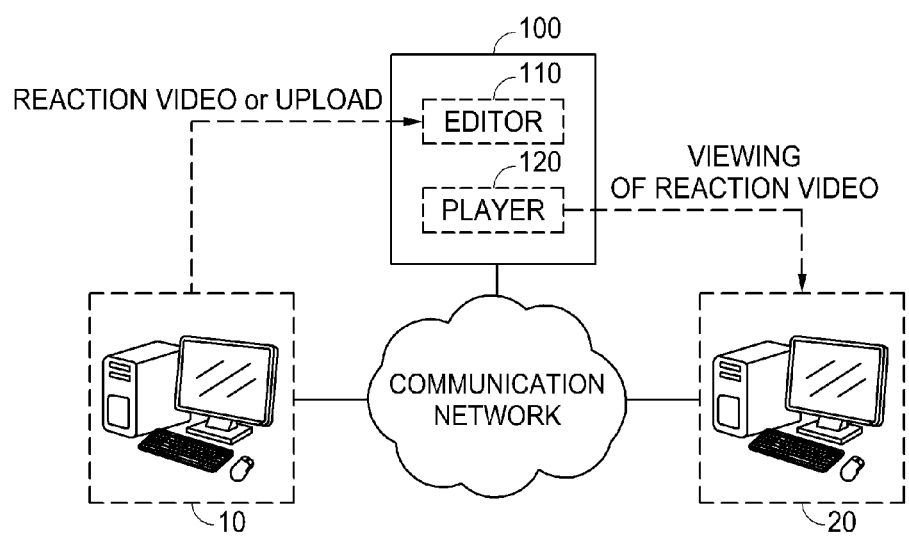
FIG. 1 is a diagram for describing a multi-window viewing system according to an embodiment of the present invention.
Figure 2:
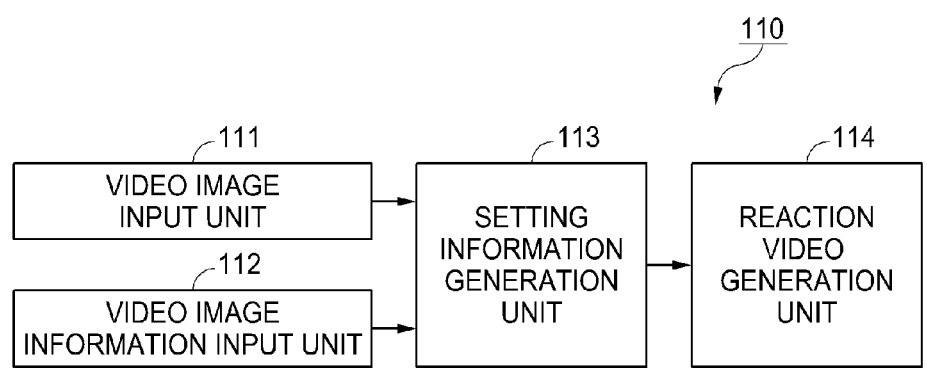
FIG. 2 is a diagram for describing a detailed configuration of an editor provided in the multi-window viewing system.
Figure 3:
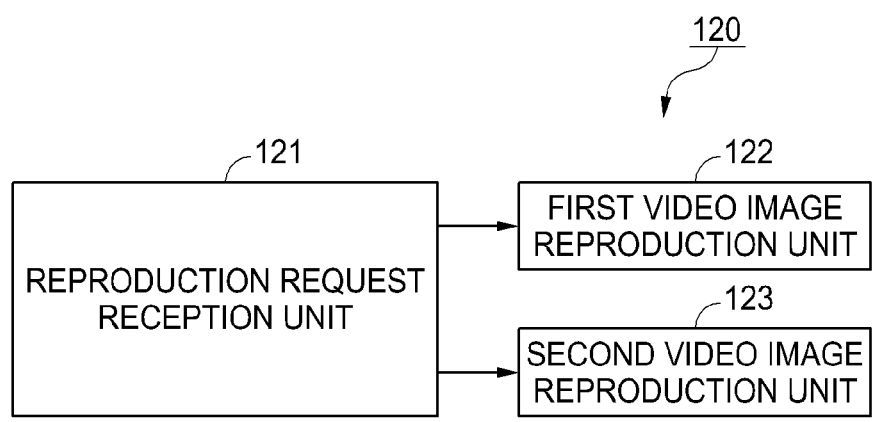
FIG. 3 is a diagram for describing a detailed configuration of a player provided in the multi-window viewing system.

Hereinafter, a preferred embodiment according to the present invention will be described in detail with reference to accompanying FIGS. 1 to 4, but will be described centering on parts necessary for understanding an operation and action according to the present invention FIG. 1 is a diagram for describing a multi-window viewing system according to an embodiment of the present invention, FIG. 2 is a diagram for describing a detailed configuration of an editor included in the multi-window viewing system, and FIG. 3 is a diagram for describing a detailed configuration of a player included in the multi-window viewing system.

Referring to FIGS. 1 to 3, a multi-window viewing system 100 according to an embodiment of the present invention is configured to include an editor 110 and a player 120.

Here, the multi-window viewing system 100 according to the embodiment of the present invention may be provided to allow a user terminal 10 of a reaction video producer who wants to produce and share a reaction video to generate and upload the reaction video, and to reproduce the reaction video on the user terminal 20 of a viewer who wants to view the reaction video.

Such a multi-window viewing system 100 according to an embodiment of the present invention of the invention may be provided as a server accessible through an Internet network or a mobile communication network, or may be provided in a form of a program installed and operated on the server described above, and may also be implemented in the form of a program or application that is installed and operated in the user terminal 10 of the reaction video producer and the user terminal 20 of the viewer.

In addition, the multi-window viewing system 100 according to the embodiment of the present invention can provide the same user experience as the conventional reaction video because at least two video images including a video image of a specific content and a video image in which the reaction video producer reacting thereto is recorded are simultaneously reproduced in synchronization with each other.

However, since the multi-window viewing system 100 according to an embodiment of the present invention does not generate the reaction video by inserting the video image of the specific content, it is possible to prevent copyright infringement due to the specific content described above.

Hereinafter, the editor 110 included in the multi-window viewing system 100 according to an embodiment of the present invention will be described.

The editor 110 is used to generate the reaction video, and configured to include a video image input unit 111, a video image information input unit 112, a setting information generation unit 113, and a reaction video generation unit 114.

The video image input unit 111 is for inputting a first video image for producing the reaction video, and the first video image described above is produced from the user terminal 10 of the reaction video producer and does not have a copyright infringement problem, and may be, for example, a video image in which the reactive video producer reacting to the specific content is recorded.

Such a video image input unit 111 is provided in a manner of storing or uploading the first video image itself received from the user terminal 10 of the reaction video producer, or may receive an Internet address of the first video image uploaded to a sharing site, etc. from the user terminal 10 of the reactive video producer.

The video image information input unit 112 is for inputting video image information on a second video image in order to insert it into the first video image, and may include an interface through which video image information is input from the user terminal 10 of the reaction video producer.

In this case, the second video image described above is a video image of the specific content to which the reaction video producer has reacted, and may be a video image which may cause a copyright infringement problem when it is stolen or used without permission, and the video image information described above may be information including an Internet address such as a uniform resource locator (URL) indicating a position where the second video image is stored.

That is, in the video image information input unit 112, the second video image, which may cause the copyright infringement problem, is not directly uploaded, but an Internet address or a unique address from which the second video image can be imported is input as video image information.

Meanwhile, information on a sound source may be input to the video image information input unit 112. Even in this case, it may be implemented in a manner of inputting the Internet address such as URL indicating a position where the sound source is stored.

The setting information generation unit 113 is for generating setting information for reproducing the second video image, and can generate setting information according to a user input which is input from the user terminal 10 of the reaction video producer, and the setting information described above may include coordinates of an area in which the second video image is to be inserted and reproduced at a predetermined position in the first video image, and information on a reproduction start time and a reproduction end time of the second video image.

Preferably, when an area in which the second video image is to be inserted and reproduced is set relatively smaller than the first video image and the video image size of the first video image is adjusted according to a user input, the setting information generation unit 113 can generate setting information so that the size of the area in which the second video image is to be reproduced is also enlarged or reduced in response thereto.

For example, the setting information generation unit 113 can generate the setting information to include information on a relative size ratio between the first video image and the second video image so that the size of the area in which the second video image is to be reproduced is also enlarged when the video image size of the first video image is enlarged to the full screen from an arbitrary size, and the size of the area in which the second video image is to be reproduced is also reduced when the video image size of the first video image is reduced to an arbitrary size from the full screen.

In addition, the setting information generation unit 113 can set information on the volume, tone, and brightness of the first video image and the second video image, respectively, and generate setting information so that each preset information is individually adjusted through the player 120 to be described later.

Meanwhile, the setting information generation unit 113 may generate the setting information so that the second video image is reproduced together with the first video image without separate editing of the second video image, but may generate the setting information so that only a partial section desired by the reaction video producer is reproduced among the entire section of the second video image.

To this end, the setting information generation unit 113 can provide an interface which allows virtual editing of the second video image or an image substituting the second video image to the user terminal 10 of the reaction video producer.

In addition, when there are a plurality of second video images intended to be inserted into the first video image, the setting information generation unit 113 can generate setting information for each second video image so that a plurality of second video images are sequentially reproduced or disappeared, or a plurality of second video images are simultaneously reproduced at different positions of the first video image.

The reaction video generation unit 114 is for generating the reaction video, and performs a function of generating a reaction video by combining the first video image, video image information, and setting information.

In this case, the reaction video generation unit 114 may generate the reaction video in a form of a video image file or a data packet, or generate the reaction video in the form of an information storing image including a quick response code (QR code).

In addition, the reaction video generation unit 114 may generate the reaction video in the form of an interactive link or thumbnail or may generate the reaction video in the form of an executable file.

Even if the reactive video producer uses the second video image which may cause copyright infringement, since the second video image is not actually inserted into the reaction video and only video image information such as an Internet address is included, such an editor 110 of the multi-window viewing system 100 according to an embodiment of the present invention can generate the reaction video without fear of copyright infringement.

Hereinafter, the player 120 included in the multi-window viewing system 100 according to an embodiment of the present invention will be described.

The player 120 is for reproducing the reaction video, and is configured to include a reproduction request reception unit 121, a first video image reproduction unit 122, and a second video image reproduction unit 123.

Such a player 120 may be implemented in the form of a program or application installed and operated on the user terminal 20 of the viewer, and may also be implemented as a plug-in program of a web browser such as Explorer, Chrome, and Firefox.

The reproduction request reception unit 121 performs a function of receiving a reproduction request for the reaction video from the user terminal 20 of the viewer.

The first video image reproduction unit 122 performs a function of reproducing the first video image of the reaction video requested to be reproduced in a first window.

In this case, the first video image reproduction unit 122 may adjust the volume, tone, and brightness of the first video image according to a user input when reproducing the reaction video.

The second video image reproduction unit 123 performs a function of reproducing the second video image of the reaction video requested to be reproduced in a second window.

In this case, the second video image reproduction unit 123 can imports the second video image by referring to video image information of the reaction video requested to be reproduced, and generate the second window at a predetermined position of the first window by referring to the setting information, and then reproduce the imported second video image in the second window.

In addition, the second video image reproduction unit 123 can start reproducing the second video image according to the reproduction start time of the setting information, and end the reproduction of the second video image according to the reproduction end time, thereby making the second window disappear.

In addition, the second video image reproduction unit 123 may detect whether or not the first video image is to be reproduced, and stop the second video image as well when the first video image is stopped.

Meanwhile, when the size of the first window in which the first video image is reproduced is adjusted by the user terminal 20 of the viewer, the second video image reproduction unit 123 may refer to information on the relative size ratio between the first video image and the second video image included in the setting information and enlarge or reduce the size of the second window in which the second video image is reproduced.

In addition, since the size of the second window in which the second video image is reproduced is relatively small compared to the first window, the second video image reproduction unit 123 can reduce the load required for reproducing the second video image by lowering resolution of the second video image and reproducing the second video image.

In addition, the second video image reproduction unit 123 may reproduce the second video image in a manner of streaming the second video image in real time, or may temporarily download or full buffer the second video image to reproduce the second video image.

In addition, the second video image reproduction unit 123 may adjust the volume, tone, and brightness of the second video image according to a user input when reproducing the reaction video.

Such a player 120 of the multi-window viewing system 100 according to an embodiment of the present invention may allow the viewer to conveniently view the reaction video using the user terminal 20 without the need for the viewer to worry about copyright infringement.

Figure 4:
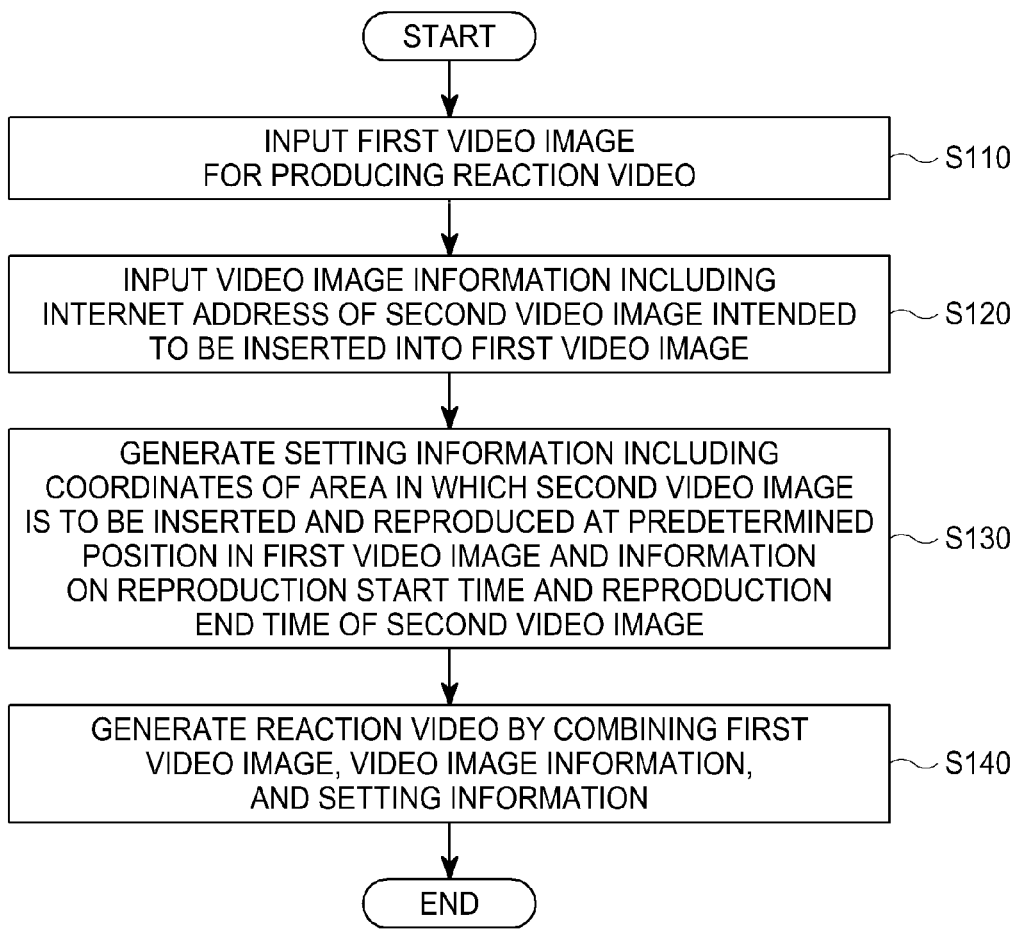
FIG. 4 is a view for describing a method for producing a reaction video using the multi-window viewing system according to the embodiment of the present invention.

FIG. 4 is a diagram for describing a method for producing the reaction video using the multi-window viewing system according to the embodiment of the present invention.

With reference to FIG. 4, the method for producing the reaction video performed in the multi-window viewing system according to the embodiment of the present invention will be described.

However, since all the functions performed in the method for producing the reaction video illustrated in FIG. 4 are performed in the multi-window viewing system described with reference to FIGS. 1 to 3, it should be noted that, even without an explicit description, all the functions described with reference to FIGS. 1 to 3 are performed in the method for producing the reaction video according to the preferred embodiment of the present invention and all the functions described with reference to FIG. 4 are performed as they are in the multi-window viewing system according to the preferred embodiment of the present invention.

First, the video image input unit receives a first video image for producing a reaction video from a user terminal (S110).

In this case, the video image input unit is preferably implemented in a manner of storing or uploading the first video image itself, but may be implemented in a manner in which the Internet address of the first video image uploaded to a sharing site, etc. is input.

In addition, the first video image described above may be a video image in which a reaction video producer who reacts to a specific content is recorded.

After that, the video image information input unit receives video image information including an Internet address with respect to the second video image intended to be inserted into the first video image from the user terminal (S120).

In this case, the second video image described above is a video image of the specific content to which the reaction video producer has reacted, and may be a video image which may cause a copyright infringement problem when it is stolen or used without permission, and the video image information described above may be information including an Internet address such as a uniform resource locator (URL) indicating a position where the second video image is stored.

After that, the setting information generation unit generates setting information including coordinates of an area in which the second video image is to be inserted and reproduced at a predetermined position in the first video image and information on a reproduction start time and a reproduction end time of the second video image, according to the user input which is input from the user terminal (S130).

In this case, when an area in which the second video image is to be inserted and reproduced is set relatively smaller than the first video image and the video image size of the first video image is adjusted according to a user input, the setting information generation unit may generate setting information so that the size of the area in which the second video image is to be reproduced is also enlarged or reduced.

The setting information generation unit may provide an interface which allows virtual editing of the second video image or an image substituting the second video image so that only a partial section desired by the reaction video producer is reproduced among the entire section of the second video image according to a user input which is input through this.

Meanwhile, when there are a plurality of second video images intended to be inserted into the first video image, the setting information generation unit 113 may generate setting information for each second video image so that a plurality of second video images are sequentially reproduced, or a plurality of second video images are simultaneously reproduced at different positions of the first video image.

In addition, the setting information generation unit may set information on the volume, tone, and brightness of the first video image and the second video image, respectively, and generate setting information so that each preset information is individually adjusted through the player 120 to be described later.

After that, the reaction video generation unit of generates a reaction video by combining the first video image, video image information, and setting information (S140).

In this case, the reaction video generation unit may generate the reaction video in a form of a video image file or a data packet, or generate the reaction video in the form of an information storing image including a quick response code (QR code).

Such a method for producing the reaction video using the multi-window viewing system according to the embodiment of the present invention prevents the occurrence of copyright infringement and makes it possible to generate the reaction video because the second video image, which may cause copyright infringement, is not actually inserted into the reaction video and only video information such as an Internet address is included.

In the description above, the preferred embodiment of the present invention has been exemplarily described, but the scope of the present invention is not limited to such a specific embodiment, and can be appropriately changed within the scope described in the claims.

The present invention can be used for generating content including a reaction video and viewing the generated content.

What is claimed is:

1. A multi-window viewing system comprising:
an editor for a reaction video; and
a player for reproducing the reaction video generated from the editor,
wherein the editor includes
a video image input unit that inputs a first video image for producing a reaction video,
a video image information input unit that inputs video image information including an Internet address of a second video image intended to be inserted into the first video image with respect to at least one the second video image,
a setting information generation unit that generates setting information including coordinates of an area in which the second video image is to be inserted and reproduced at a predetermined position in the first video image and information on a reproduction start time and a reproduction end time of the second video image, and
a reaction video generation unit that generates a reaction video by combining the first video image, the video image information, and the setting information,
wherein the player includes:
a reproduction request reception unit that receives a reproduction request for the reaction video;
a first video image reproduction unit that reproduces the first video image of the reaction video requested to be reproduced in a first window; and
a second video image reproduction unit that imports (=loads) the second video image by referring to the video image information of the reaction video requested to be reproduced, generates a second window at a predetermined position of the first window by referring to the setting information, and then reproduces the imported second video image in the second window.

2. The multi-window viewing system of claim 1, wherein the first video image is a video image in which a reaction video producer who reacts to a specific content is recorded; and
the second video image is a video image of the specific content to which the reaction video producer has reacted.

3. The multi-window viewing system of claim 1, wherein the setting information generation unit, when generating the setting information, sets an area in which the second video image is to be inserted and reproduced relatively smaller than that of the first video image, but, if a video image size of the first video image is adjusted, generates the setting information so that a size of an area in which the second video image is to be reproduced is also enlarged or reduced in response thereto.

4. The multi-window viewing system of claim 1, wherein the setting information generation unit, when generating the setting information, sets information on volume, tone, and brightness of the first video image and the second video image, respectively, and generates the setting information so that each of the set information is individually adjusted through the player.

5. The multi-window viewing system of claim 1, wherein the reaction video generation unit, when generating the reaction video, generates the reaction video in a form of a video image file or data packet.

6. The multi-window viewing system of claim 1, wherein the reaction video generation unit, when generating the reaction video, generates the reaction video in a form of an information storing image including a quick response code (QR code).

7. The multi-window viewing system of claim 1, wherein the setting information generation unit, when there are a plurality of second video images intended to be inserted into the first video image, generates the setting information for each second video image.

8. The multi-window viewing system of claim 7, wherein the second video image reproduction unit starts reproducing the second video image according to the reproduction start time of the setting information and ends the reproduction of the second video image according to the reproduction end time, thereby making the second window disappear, and stops reproducing the second video image as well when the first video image is stopped.

9. The multi-window viewing system of claim 7, wherein the second video image reproduction unit, when the size of the first window in which the first video image is reproduced is adjusted, enlarges or reduces the size of the second window in which the second video image is reproduced accordingly.

10. The multi-window viewing system of claim 6, wherein the first video image reproduction unit, when reproducing the reaction video, adjusts the volume, tone, and brightness of the first video image according to a user input; and
the second video image reproduction unit, when reproducing the reaction video, adjusts the volume, tone, and brightness of the second video image according to the user input.

11. A multi-window viewing system comprising:
an editor for a reaction video; and a player for reproducing the reaction video generated from the editor, wherein the editor includes a video image input unit that inputs a first video image for producing a reaction video, a video image information input unit that inputs video image information including an Internet address of a second video image intended to be inserted into the first video image with respect to at least one the second video image, a setting information generation unit that generates setting information including coordinates of an area in which the second video image is to be inserted and reproduced at a predetermined position in the first video image and information on a reproduction start time and a reproduction end time of the second video image, and a reaction video generation unit that generates a reaction video by combining the first video image, the video image information, and the setting information, wherein the setting information generation unit, when there are a plurality of second video images intended to be inserted into the first video image, generates the setting information for each second video image; and the second video image reproduction unit starts reproducing the second video image according to the reproduction start time of the setting information and ends the reproduction of the second video image according to the reproduction end time, thereby making the second window disappear, and stops reproducing the second video image as well when the first video image is stopped.

12. The multi-window viewing system of claim 11, wherein the first video image is a video image in which a reaction video producer who reacts to a specific content is recorded; and the second video image is a video image of the specific content to which the reaction video producer has reacted.

13. The multi-window viewing system of claim 11, wherein the setting information generation unit, when generating the setting information, sets an area in which the second video image is to be inserted and reproduced relatively smaller than that of the first video image, but, if a video image size of the first video image is adjusted, generates the setting information so that a size of an area in which the second video image is to be reproduced is also enlarged or reduced in response thereto.

14. The multi-window viewing system of claim 11, wherein the setting information generation unit, when generating the setting information, sets information on volume, tone, and brightness of the first video image and the second video image, respectively, and generates the setting information so that each of the set information is individually adjusted through the player.

15. The multi-window viewing system of claim 11, wherein the reaction video generation unit, when generating the reaction video, generates the reaction video in a form of a video image file or data packet.

16. The multi-window viewing system of claim 11, wherein the reaction video generation unit, when generating the reaction video, generates the reaction video in a form of an information storing image including a quick response code (QR code).

17. The multi-window viewing system of claim 11, wherein the second video image reproduction unit starts reproducing the second video image according to the reproduction start time of the setting information and ends the reproduction of the second video image according to the reproduction end time, thereby making the second window disappear, and stops reproducing the second video image as well when the first video image is stopped.

18. The multi-window viewing system of claim 16, wherein the first video image reproduction unit, when reproducing the reaction video, adjusts the volume, tone, and brightness of the first video image according to a user input; and the second video image reproduction unit, when reproducing the reaction video, adjusts the volume, tone, and brightness of the second video image according to the user input.

19. The multi-window viewing system of claim 11, wherein the second video image reproduction unit, when the size of the first window in which the first video image is reproduced is adjusted, enlarges or reduces the size of the second window in which the second video image is reproduced accordingly.

* * * * *